United States Patent [19]

Beiter

[11] 3,849,661

[45] Nov. 19, 1974

[54] TAPE TRANSPORT CONTROL SYSTEM

[75] Inventor: Glenn A. Beiter, Louviers, Colo.

[73] Assignee: Honeywell Inc., Minneapolis, Minn.

[22] Filed: June 12, 1972

[21] Appl. No.: 262,020

[52] U.S. Cl. ............... 250/571, 235/92 V, 250/209, 242/75.52

[51] Int. Cl. ........................................ G01n 21/30

[58] Field of Search ....... 250/209, 219 FR, 219 DR, 250/219 L, 548, 571; 242/184, 75.52; 235/61.11 E, 92 V; 318/6; 360/72; 33/137 R, 140; 179/100.2 R

[56] References Cited

UNITED STATES PATENTS

| | | | |
|---|---|---|---|
| 2,760,137 | 8/1956 | Andrews | 250/219 X DR |
| 3,156,397 | 11/1964 | Davies | 318/6 X |
| 3,249,758 | 5/1966 | De Luca et al. | 250/219 FR |
| 3,323,700 | 6/1967 | Epstein et al. | 250/219 X DR |
| 3,354,318 | 11/1967 | Wahlstrom | 250/219 L |
| 3,400,895 | 9/1968 | Cole et al. | 242/184 |
| 3,713,606 | 1/1973 | Van Pelt et al. | 242/184 |

*Primary Examiner*—Walter Stolwein
*Attorney, Agent, or Firm*—Arthur H. Swanson; Lockwood D. Burton; Mitchell J. Halista

[57] ABSTRACT

A tape transport control system for monitoring the amount of tape on a tape reel using first transducer means to provide a signal representative of rotational speed of the tape reel and second transducer means to provide a similar representation of the rotational speed of a tape drive capstan. The signals from the transducers are compared by a comparator circuit to determine the amount of tape remaining on the tape reel which condition is represented by a predetermined ratio of the output signals obtained from the capstan and reel transducer means. The output signal from the comparator can be used to reverse or stop the tape transport to prevent the tape from completely unwinding from the monitored tape reel. In a reel-to-reel tape transport system, the control of the tape sensing circuit is automatically switched from one reel to the other reel upon the detection of a low tape condition in a previously monitored reel, and the operation of the tape transport is reversed to transport the tape from the full reel to the empty reel.

6 Claims, 1 Drawing Figure

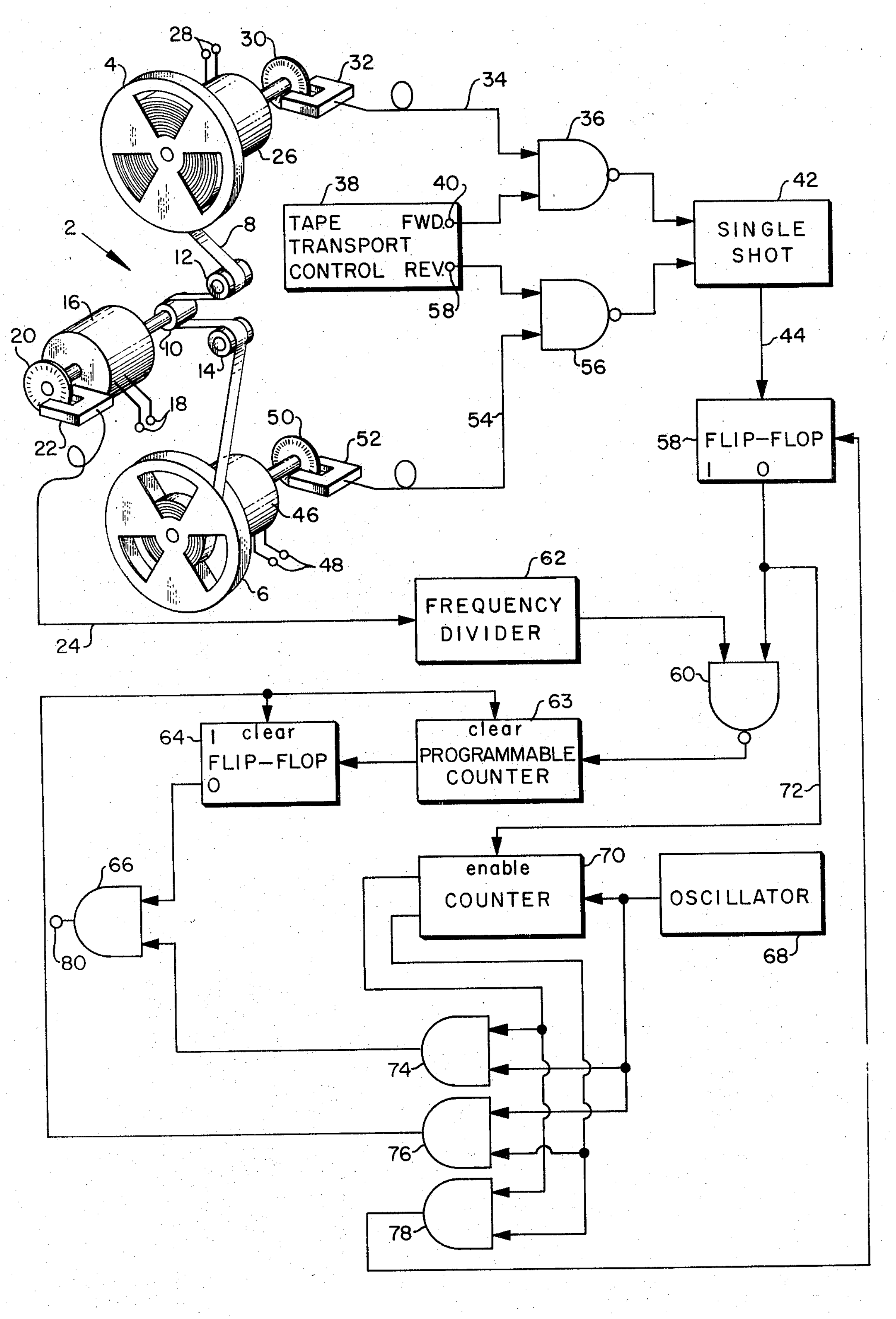
TAPE TRANSPORT CONTROL
FWD.
REV.
SINGLE SHOT
FLIP-FLOP
1 0
FREQUENCY DIVIDER
clear
PROGRAMMABLE COUNTER
1 clear
FLIP-FLOP
0
enable
COUNTER
OSCILLATOR
2
4
6
8
10
12
14
16
18
20
22
24
26
28
30
32
34
36
38
40
42
44
46
48
50
52
54
56
58
60
62
63
64
66
68
70
72
74
76
78
80

TAPE TRANSPORT CONTROL SYSTEM

BACKGROUND OF THE INVENTION

The need for sensing end-of-tape in tape recorders has long been recognized and many prior art devices have been developed to accomplish this function. The earliest devices employed a "feeler" arm to detect the amount of tape remaining on a reel, examples of such devices are shown in U.S. Pat. Nos. 3,069,777 and 3,126,641. The use of such mechanical arms was not wholly satisfactory inasmuch as damage to the tape often resulted and the arms presented mechanical problems in operating the tape transport. Later developments were directed toward the use of optical sensors, examples of such being shown in U.S. Pat. Nos. 3,249,758 and 3,461,248. Such optical sensors, however, exhibited a new set of problems which included a sensitivity to ambient light, higher expense, and unstable control over long periods of time. Accordingly, it is desirable to provide an end-of-tape sensor for transports which overcomes the aforesaid objections to the prior art devices by utilizing a completely electronic approach. Such an electronic apparatus would eliminate mechanical adjustments, tape wear, sensitivity to ambient light and long term instability.

An object of the present invention is to provide a tape transport control system utilizing an improved end-of-tape sensor apparatus using electronic circuits mechanically independent of either the tape or tape reels.

Another object of the present invention is to provide an improved end-of-tape sensor using digital circuitry for monitoring the amount of tape remaining on a reel.

SUMMARY OF THE INVENTION

In accomplishing these and other objects, there has been provided, in accordance with the present invention, a tape transport control system for monitoring the amount of tape on a tape storage reel using a first transducer means arranged to produce a signal representative of the rotational speed of a tape storage reel, a second transducer arranged to produce a signal representative of the rotational speed of a capstan driving the tape supplied from said tape storage reel and comparator means for comparing the signal from said first transducer means with the signal from said second transducer means to produce an output signal representative of a predetermined ratio between said compared signals. The output signal may be used to reverse the operation of the tape transport system to prevent a tape from being completely unwound from a monitored storage reel and to automatically switch control of the end-of-tape sensing system to a third transducer means producing an output signal representative of the rotational speed of a filled tape reel in a reel-to-reel tape transport whereby the tape is alternately shuttled between a full and an empty reel.

BRIEF DESCRIPTION OF THE DRAWING

A better understanding of the present invention may be had when the accompanying description is read in connection with the single FIGURE drawing in which the single FIGURE is a block diagram of a tape transport control system embodying the present invention.

DETAILED DESCRIPTION

Referring to the single FIGURE drawing in more detail, there is shown a tape transport control system for controlling a tape driving apparatus 2 having a first storage reel 4 and a second storage reel 6. A tape 8 is driven between the first and second storage reels 4 and 6 by a suitable tape drive means such as a capstan 10. The tape is disposed in a predetermined path between the tape reels 4 and 6 and is supported along this path by a pair of guide rollers 12 and 14 as well as the capstan 10. A capstan drive motor 16 is connected to the capstan 10 and is arranged to be energized by an energizing signal applied to a pair of motor input terminals 18 from any suitable source 7 as described hereinafter. A code wheel 20 is attached to one end of the motor shaft of the capstan drive motor 16 to be driven by the motor 16 concurrently with the capstan 10. The code wheel 20 has regularly occurring code indicia arranged thereon, and a sensing means 22 is positioned adjacent to the code wheel 20 to sense these indicia and to provide an output signal representative of the sensed indicia along a sensor output line 24. The indicia on the code wheel 20 and the sensor 22 may be any suitable arrangement for sensing such indicia, e.g., optical, magnetic, etc., such devices being well known in the art.

The first tape reel 4 is driven by a first tape reel motor 26 having a pair of input terminals 28 arranged to be connected to a suitable source of energizing signal, as described hereinafter. One end of the motor shaft of the first reel motor 26 is connected to a code wheel 30 having code indicia thereon and which is associated with a code wheel sensor 32. The second code wheel 30 and sensor 32 may be similar to the aforesaid first code wheel 20 and sensor 22, although the number of indicia on the code wheel 30 need not be the same as the number of indicia on the code wheel 20. An output signal from the sensor 22 is applied along an output line 34 to one input signal of a two input NAND gate 36. A second input signal to the NAND gate 36 is obtained from a tape transport control means 38, such devices being well known in the art. Specifically, an output signal from the tape transport control means 38 representative of a desired forward motion of the tape 8 is provided from a "forward" output terminal 40 and is applied as a second input signal to the NAND gate 36. An output signal from the NAND gate 36 is applied to a single shot 42 to produce an output signal having a predetermined duration on an output line 44.

Similarly, the second reel 6 is arranged to be driven by a second reel motor 46 connected to a pair of motor energizing signal terminals 48. The tape transport control means 38 may be arranged to include power supply means for the reel motors 26 and 46 and for the capstan motor 16. These power supplies would be interconnected to the selection of the "forward" and "reverse" operating states of the tape transport by the control means 38. Thus, the direction of rotation of the capstan 16 and the reel motors 26 and 46 would be concurrently selected to drive the tape 8 in the desired direction. Such tape transport control devices are well known in the art and, since the details thereof do not form a part of the present invention, the transport control means 38 has been described only to the extent of supplying "forward" and "reverse" output signals for application to the NAND gates 36 and 56 concomitantly with the operation of the reel and capstan motors in the desired direction. A code wheel 50 and sensor 52 are connected to the motor shaft of the second reel motor 46 in a manner similar to that described above for the code wheel 30 and sensor 23. An output signal from the third sensor 52 is applied along an output line 54 as a first input signal to a second NAND gate 56. A second input signal for the NAND gate 56 is obtained from the tape transport control means 38 and is representative of a desired reverse motion of the tape 8. Specifically, an output signal from a "reverse" output terminal 58 is applied to the second input of the NAND gate 56. An output signal from the NAND gate 56 is, also, applied to the single shot 42 to produce the aforesaid output signal on the output line 44. The output line 44 is connected to a flip-flop 58 and is arranged to trigger the flip-flop 58 into alternate logical states. An output signal from the logical "0" state of the flip-flop 58 is applied to one input of a third NAND gate 60. A second input signal to the NAND gate 60 is obtained from a frequency divider 62 which is, in turn, fed by an output signal along the output line 24 from the first indicia sensor 22.

An output signal from the third NAND gate 60 is applied to a programmable counter means 63. The output signal from the programmable counter means 63 indicative of the attainment of a predetermined count level is applied to a second flip-flop 64 to change the logical state thereof. An output signal from the logical "0" output of the second flip-flop 64 is applied as one input signal of a fourth NAND gate 66. A second input signal for the fourth NAND gate 66 is obtained from a signal generating network driven by a fixed oscillator 68. Specifically, an output signal from the oscillator 68 is applied to a counter means 70. The counter means 70 is enabled to perform a counting function by the aforesaid output signal from the logical "0" side of the first flip-flop 58 applied along an "enable" signal line 72. The counter 70 is arranged to produce timing signals for controlling the system by applying output signals to three gates 74, 76 and 78. Specifically, a first output signal from the counter 70 is applied as an input signal to the first and third gates 74 and 78 while a second output from the counter 70 is applied as a first input signal to the second gate 76 and a second input signal to the third gate 78. A second input signal for the gates 74 and 76 is obtained from the oscillator 68. An output signal from the first gate 74 is applied to the fourth NAND gate 66 to control an output signal on an output terminal 80 connected to the output of the NAND gate 66. An output signal from the second gate 76 is applied to "clear" the programmable counter 63, while an output from the third gate 78 is arranged to reset the flip-flop 58 to enable a new count series to begin.

In operation, the capstan tachometer pulses from the sensing means 22 are applied over line 24 to the frequency divider 62 which divides the tachometer frequency by a preset number, e.g., 1,000. The output of this countdown operation is applied to the NAND gate 60 for a low tape comparison. The output signal from the reel motor tachometer units are applied over lines 34 and 54 to NAND gates 36 and 56, respectively. The appropriate one of these gates is selected by the transport control means 38 by means of an output signal indicative of either a "forward" or "reverse" operation of the tape transport system. Thus, one of the NAND gates 36 and 56 is enabled and the tachometer pulse as applied thereto are routed to the single shot 42 for waveshaping before being applied to the output line 44. The output signal from the single shot on line 44 is applied to the flip-flop 58 to change the state thereof to a logical "0" state. The logical "0" state of the flip-flop 58 is applied to the NAND gate 60 to control the pulses from the frequency divider 62 indicative of the aforesaid countdown operation. When the NAND gate 60 is enabled by the output signal from the logical "0" side of the flip-flop 58, pulses from the frequency divider 62 are applied to the programmable counter 63.

The counter 63 can be programmed to count by a given number which is dependent on the frequency of the capstan tachometer output and the frequency divider 62. For example, assuming that the code wheel 20 on the capstan motor 16 has 12,000 lines for generating 12,000 output pulses for each rotation of the motor 16, the tape drive system is arranged to generate 52,000 pulses from the capstan sensor 22 for each revolution of a tape reel at the desired low tape point. Thus, if there is more than the minimum amount of tape on the reel, there will be more than 52,000 capstan pulses per reel revolution. Since the frequency divider 62 divides by 1,000, the count of the programmable counter is set to divide the output of the divider 62 by a number dependent on the type of reel being used, e.g., 52. Thus, if the total count per reel revolution is 52,000 or more indicating sufficient tape remaining on the reel, a pulse is produced at the output of the counter 63 and is applied to the flip-flop 64 to set the flip-flop 64 to a logical "1" state. It should be noted that the aforesaid count relationship can be monitored by having only a single indicia on the reel code wheels 30 and 50. In the event that a more precise monitoring of tape footage on a tape reel is desired, the numerical relationship of the counted capstan code wheel indicia to reel revolutions can be altered and more indicia used on the code wheels 30 and 50. In any case, the output signal from either of the reel sensors 32 and 52 is a frequency modulated signal having a frequency directly dependent on the rotational speed of the associated tape reel and inversely proportional to the amount of tape stored on the reel, i.e., a large amount of tape is represented by a low frequency sensor signal and vice versa. The next output pulse from the single shot 44 to the flip-flop 58 causes the flip-flop 58 to change state which inhibits the gate 60 to stop the pulses from the frequency divider 62 from being applied to the counter 63. With the count stopped, the counter 70 is enabled to provide the timing pulses by operating from the system to determine if a count of 52,000 from the capstan sensor has been reached. The first output signal from the counter 70 indicative of a first count of signals from the oscillator 68 is applied to the first gate 74 to enable the output gate 66. However, since the flip-flop 64 has previously been switched to the logical "1" state, no output signal is produced on the output terminal 80. The second output signal from the counter 70 representative of a second count is applied to the gate 76 and 78 to produce output signals therefrom. Specifically, the gate 76 is enabled to produce an output signal in the presence of the second count signal and an output signal from the oscillator 68. This output signal is used to reset the flip-flop 64 and the counter 63. The second count output signal from the counter 70 is also applied to the gate 78 in combination from the first count signal stored in the counter 70 to produce an output signal from the gate 78 which is applied to the flip-flop 58 to reset it to a logical "0" state to start a new count sequence.

On the other hand, if the count is less than 52,000 capstan pulses for each revolution of the tape reel which count is indicative of low tape on the reel being sampled, a pulse is passed through the output gate 66 from the flip-flop 64 to the output terminal 80 when the gate 66 is enabled by an output signal from the gate 74 to indicate low tape. The output signal on the output terminal 80 may be applied to an indicator (not shown) to indicate a low tape condition or may be used for other control action, such as reversing the operation of the tape transport control 38 from its previous state to the other state, e.g., "forward" to "reverse." The further operation of the system is, of course, a repetition of the aforesaid operation with the other reel tachometer disc being sampled by a switch of the operation of the transport control 38 to enable the other one of the NAND gates 36 and 56 to pass pulses to the single shot 42. Since the sampling cycle, including resetting and clearing of the logic elements, is arranged to occupy a small portion of the time of the revolution of a tape reel, e.g., 2 microseconds, it can be ignored when programming the counter 63.

Accordingly, it may be seen that there has been provided, in accordance with the present invention, a tape transport control system for electronically identifying and indicating a low tape state of a tape storage reel.

The embodiments of the invention in which an exclusive property or privilege is claimed are defined as follows:

1. A tape transport control system comprising:

a tape drive capstan means for driving a tape at a predetermined speed;

first sensor means arranged to produce a frequency modulated output signal indicative of the rotational speed of said tape drive capstan means;

second sensor means arranged to produce a frequency modulated output signal indicative of the rotational speed of a tape storage reel operatively associated with said capstan means, which last-mentioned rotational speed varies in inverse proportion to the amount of tape stored on the tape storage reel; and comparator means for comparing the two frequency modulated output signals to produce an output signal indicative of a predetermined relationship representative of the amount of tape stored on the tape storage reel.

2. A tape transport control system as set forth in claim 1 wherein said first sensor means includes a tachometer disc having discrete indicia recorded thereon, means for driving said disc at the speed of the capstan and means for sensing said indicia to produce output signals in response thereto.

3. A tape transport control system as set forth in claim 2 wherein said second sensor means includes a tachometer disc having discrete indicia recorded thereon, means for driving said last-mentioned disc at the speed of the tape storage reel and means for sensing said second-mentioned indicia to produce output signals in response thereto.

4. A tape transport control system as set forth in claim 1 wherein said comparator means includes counter means for counting the output signal from said first sensor means and means responsive to the output signal from said second sensor means to provide said output signal indicative of a predetermined relationship upon the attainment of a predetermined count by said counter means.

5. A tape transport system as set forth in claim 1 and including third sensor means arranged to produce a second frequency modulated signal indicative of the rotational speed of a second tape storage reel arranged to cooperate with said first-mentioned tape storage reel to store said tape therebetween, and switching means connected between said first sensor means and said comparator means and between said third sensor means and said comparator means and selectively operable to apply a desired output signal from said first and third sensor means to said comparator means.

6. A tape transport system as set forth in claim 5 wherein each of said first, second and third sensor means includes a tachometer disc having discrete indicia recorded thereon, means for driving said tachometer disc at the rotational speed of an associated tape transport drive element and means for sensing said indicia to produce output signals in response thereto.

* * * * *